INVENTORS
DEREK WOOD
BY LEO V. NORRUP, JR.
Nilsson, Robbins & Anderson
ATTORNEYS INVENTORS
DEREK WOOD
BY LEO V. NORRUP, JR.
Nilsson, Robbins & Anderson
ATTORNEYS

LEGEND   FIG. 7

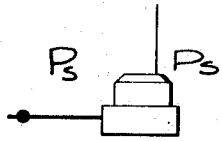
SERVOVALVE WITH TWO PRESSURE SOURCES CONTROLLED BY ELECTRICAL AND MECHANICAL INPUT SIGNALS

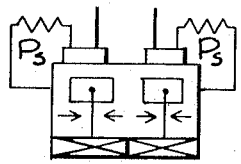
DUAL SERVOVALVE WITH MONITORING AND SWITCHING VALVES

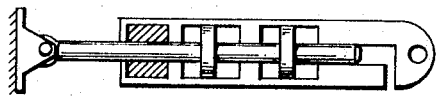
DUAL TANDEM MOVING BODY ACTUATOR

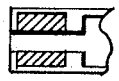
MECHANICAL PISTON LOCK

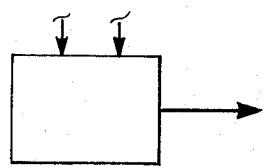
COMPARATOR – ONE FAILURE MODE

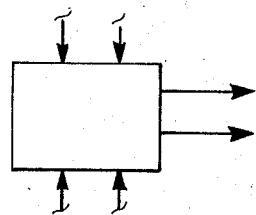
COMPARATOR – TWO FAILURE MODES

●————— MECHANICAL SIGNALS

——————— ELECTRICAL SIGNALS

—————▶ HYDRAULIC SIGNALS

INVENTORS
DEREK WOOD
BY LEO V. NORRUP, JR.
Nilsson, Robbins & Anderson
ATTORNEYS United States Patent Office 3,368,351
Patented Feb. 13, 1968

3,368,351
REDUNDANT CONTROL SYSTEM
Derek Wood, Sun Valley, and Leo V. Norrup, Jr., La Crescenta, Calif., assignors to Bell Aerospace Corporation, a corporation of Delaware
Filed Dec. 23, 1965, Ser. No. 515,873
10 Claims. (Cl. 60—97)

This invention relates generally to control systems and more particularly to redundant control systems for use specifically to control the positioning of a plurality of surfaces in conjunction with and proportional to the receipt of one or more input signals and which is particularly adapted to detect and disable a failed portion of the control system.

Although not limited thereto, the present control system is particularly adapted for utilization with hydraeric pressures and signals. The term "hydraeric" as used throughout this specification and the appended claims is defined as being generic to hydraulics and pneumatics and is therefore synonymous in the board sense with fluid under pressure. The term "command function" as used throughout this specification and the appended claims is defined as being the ability to effect movement of a controlled surface in response to the application of input signals to the control system.

It has been found in many control system applications that it becomes necessary to utilize a redundant control system. Such is required when the overall requirements of a particular apparatus which is to be controlled requires a reliability above and beyond that which is normally available with the utilization of a single chain control system for performance of the control function. Thus, in order to effect the desired reliability the control system is duplicated in one or more fashions to obtain the desired redundancy thereof. Such redundancy is particularly required and is applicable to present generation aircraft flight control systems. The present invention will, therefore, be described with specific reference of its application to an aircraft flight control system. Those skilled in the art, however, will immediately recognize other applications to which the system may be put. Although the illustrations in the drawings and the following description will be restricted to that of a typical aircraft flight control system, such is not to be taken as a limitation to be inserted into the claims as appended hereto.

For purposes of example only, present-generation aircraft provide an excellent situation wherein redundancy is required. As is well known present-day aircraft are of two types. First is the large subsonic type aircraft wherein extremely large control surfaces are required and are such that the strength of the pilot is insufficient to manually manipulate the control surface. The second type aircraft utilized today and to be utilized in the foreseeable future is the extremely fast supersonic aircraft in which as a result of high speed the pressure center of the aircraft moves forward and either coincides with or is forward of the center of gravity of the aircraft, thus causing the aircraft to become aerodynamically unstable at such extremely high speeds. In either of these two situations, it no longer is possible for the pilot to manually manipulate control surfaces of the aircraft and therefore a power assist of some type must be utilized.

Similar situations can readily be recognized in other fields by those skilled in the art. To have proper reliability in such cases where a power assist or similar equipment is inserted into the system, redundancy must be relied upon so that in the event of failure of a portion of the control system, the command function thereof can be if such is desired, switched to a different unfailed portion of the system automatically. Such redundancy can be obtained by paralleling a plurality of portions of a control system each capable of performing the command function; i.e., a control chain, or by paralleling individual components within a specific control chain. In any redundant control system one must be concerned with the number of control chains which are available for transfer, in the event of a failure of one, and at the same time, one must also be concerned with the capability and speed with which transfers can be effected from one control chain to another control chain in the event of a failure of one such control chain.

One must also be concerned with the power source available to the flight control system for operation thereof; i.e., the redundancy of the overall control system would be of little or no benefit to the aircraft if the initial power source were subject to failure upon the failure of a single portion of the system, such for example as one of the engines of an aircraft.

Particularly with the supersonic type aircraft having a plurality of control surfaces to perform a given function, i.e., split control surfaces, the position of such a split portion of the control surface in the event of a failure thereof can become extremely critical. This follows since a very small movement of a relatively small control surface at extremely high speed can have extremely major effects upon the flight attitude of the aircraft. It is, therefore, important that the positioning of the control surface be maintained within certain predetermined specified limits in the event of a failure of that particular control chain which positions the control surface or split segment thereof.

Accordingly, it is an object of the present invention to provide a control system which is inherently extremely reliable in that a plurality of control chains is provided to insure redundancy within the control system.

It is another object of the present invention to provide a redundant control system having a plurality of control chains therein wherein extremely fast and highly reliable transfer can be effected from one control chain to another in the event of failure within one of the control chains.

It is a further object of the preent invention to provide a redundant control system which is capable of utilization in the manner of paralleling control chains within a system or in the manner of paralleling individual components within a control chain within a control system.

It is still another object of the present invention to provide a redundant control system wherein the sources of power applied to the control system are generated in a redundant manner.

It is a still further object of the present invention to provide a redundant control system wherein electrically generated input signals applied automatically to the control system in conjunction with any signals generated manually are developed and applied in a redundant manner to the control system.

It is still a further object of the present invention to provide an automatic locking mechanism which operates mechanically in the event of a power failure for a particular control surface which permits the surface to move to a predetermined position and thereafter causes the same to remain in that position.

Other objects and advantages of the present invention both as to its organization and method of operation will become apparent to those skilled in the art from a consideration of the following description taken in conjunction with the accompanying drawings which are presented by way of example only as a specific apparatus to which the control system of the present invention may be applied and are therefore not to be taken as a direct limitation upon the claims as appended hereto and in which:

Figure 3:
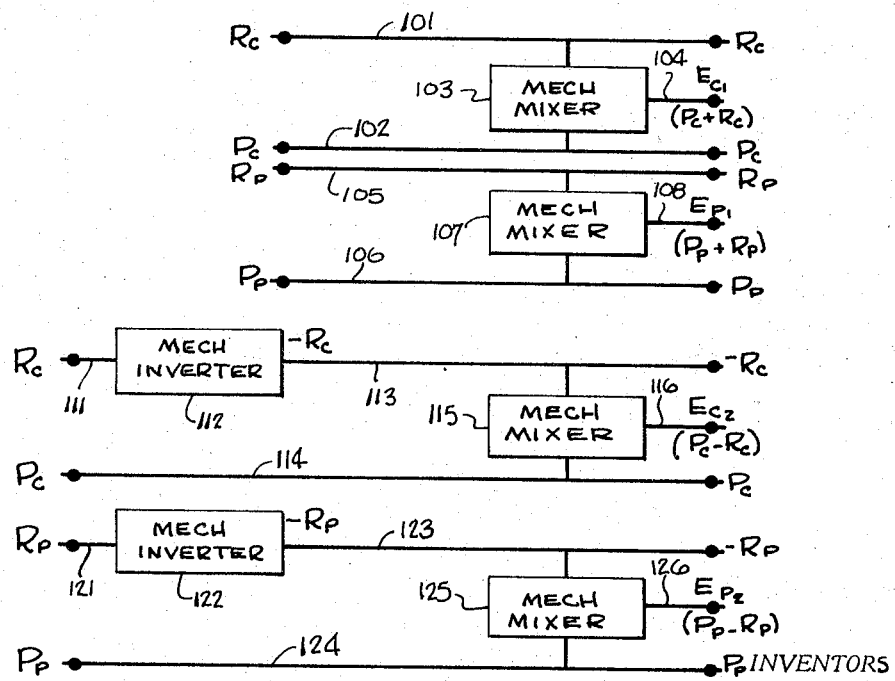
Figure 4A:
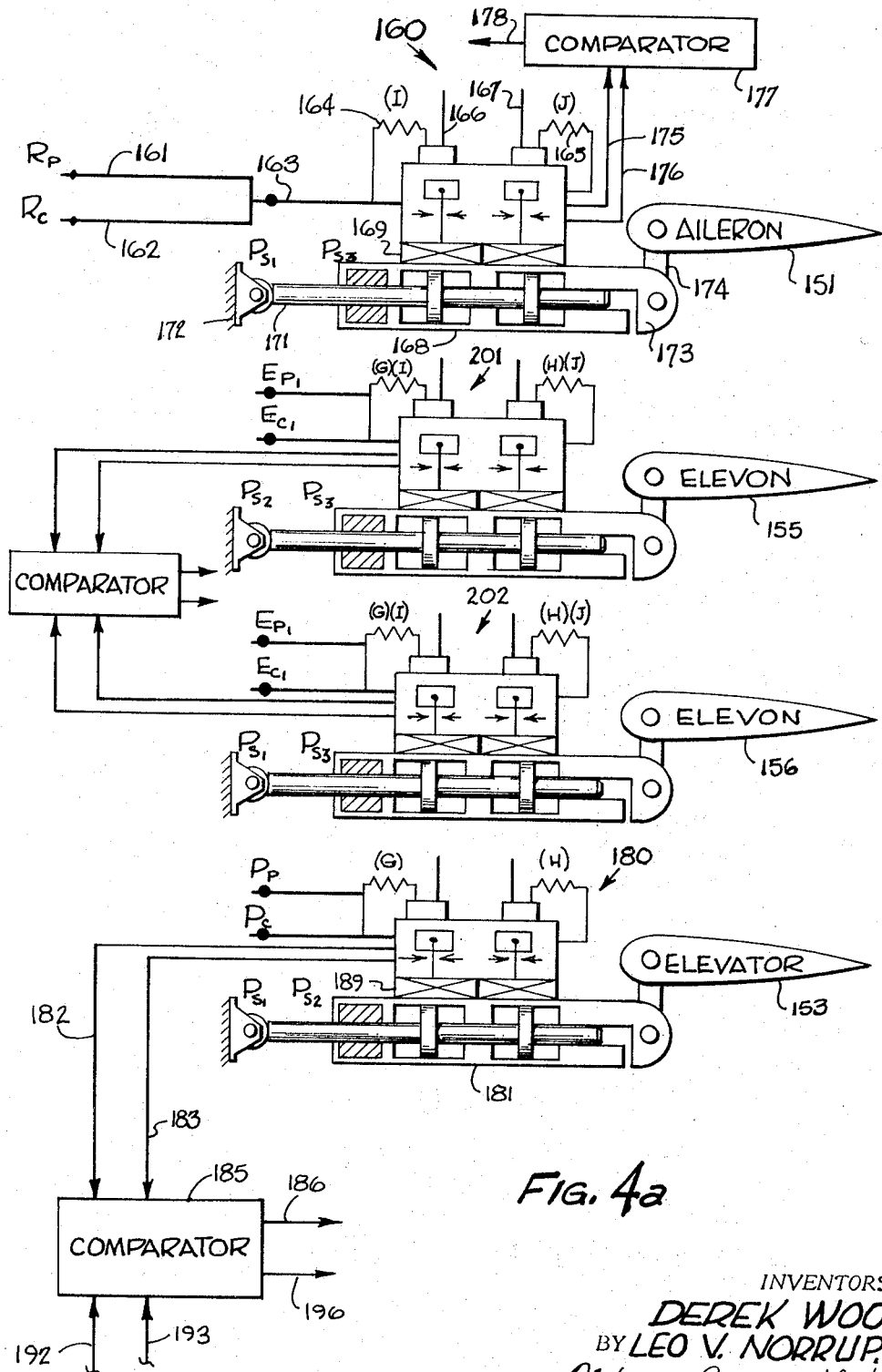
Figure 4B:
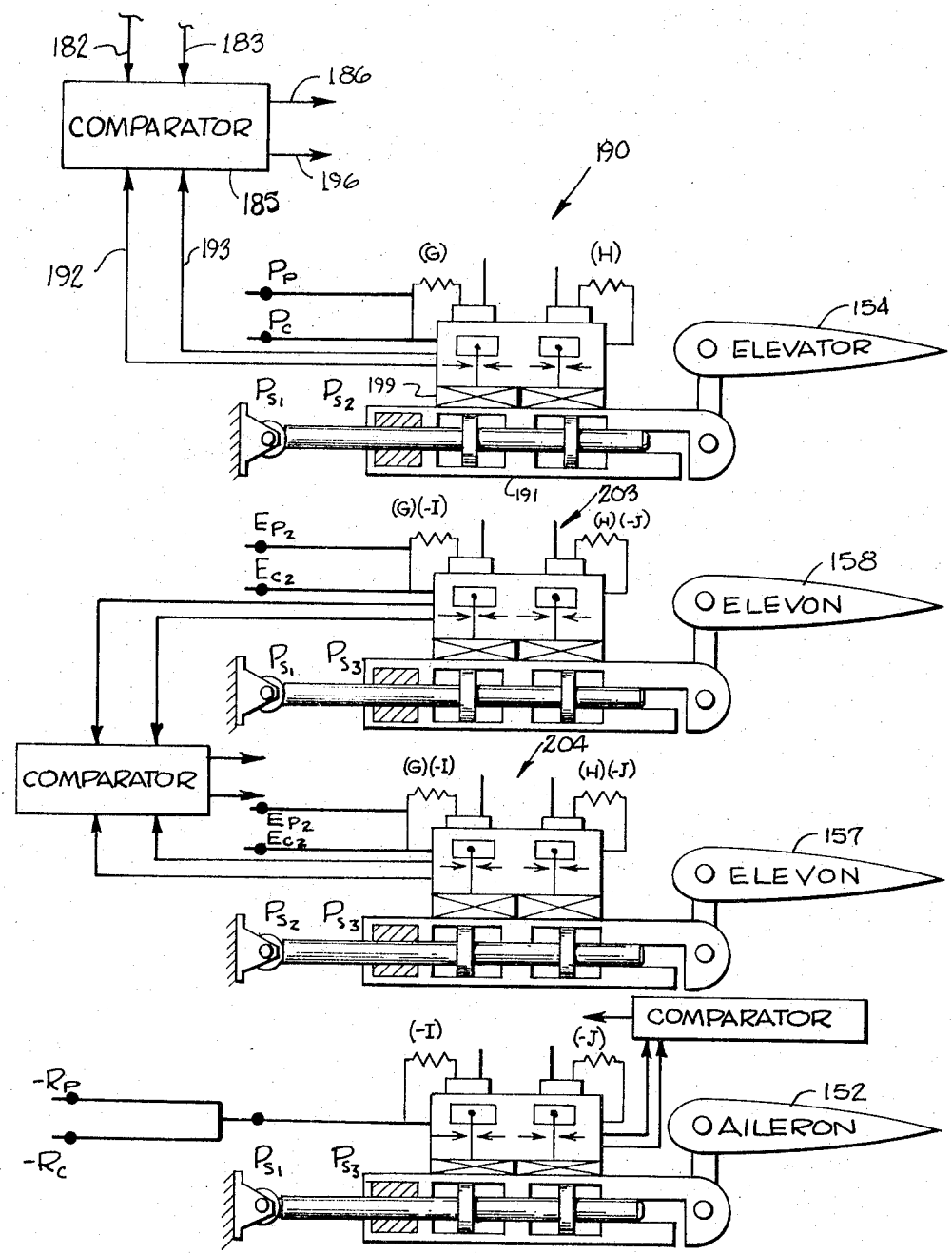
Figure 5:
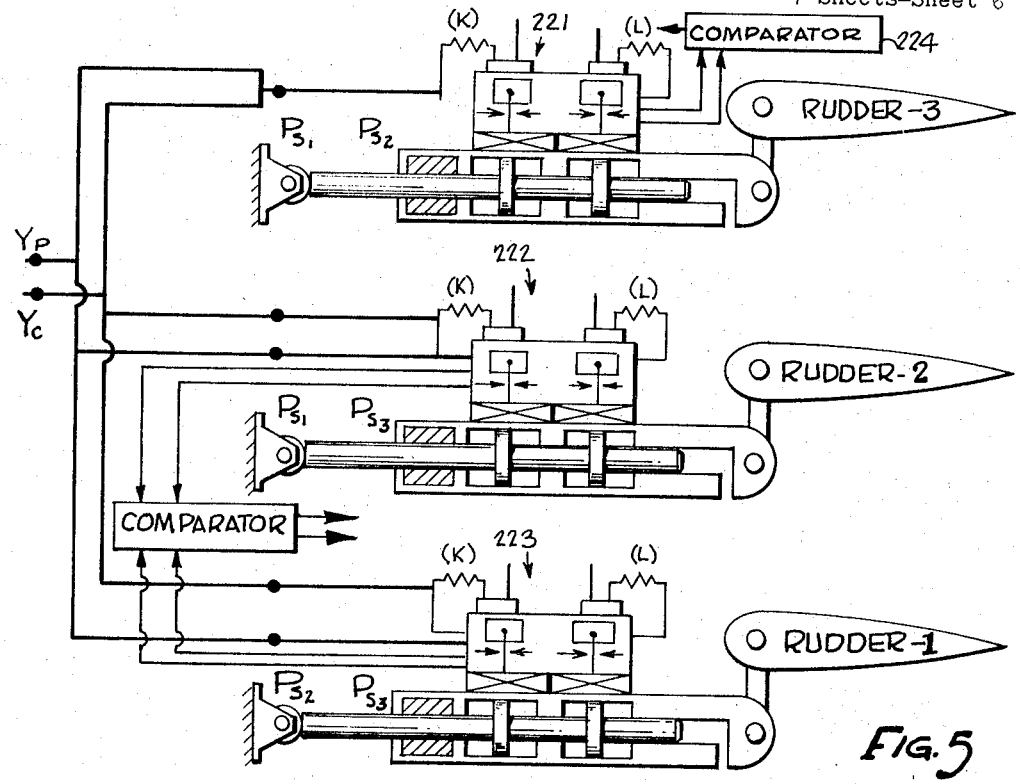
Figure 6:
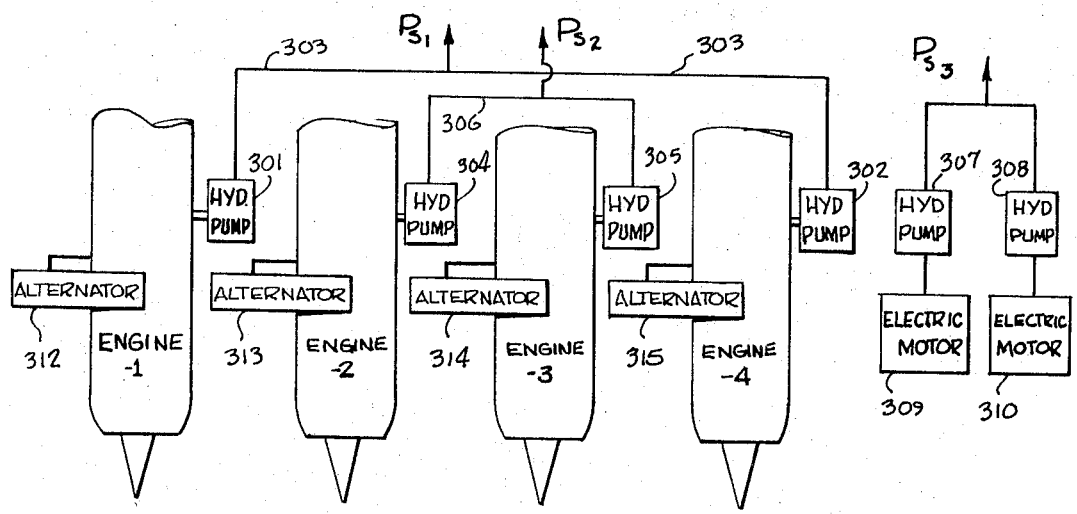

FIGURE 3 schematically illustrates the mechanical mixing of the signals generated by the pilot's and co-pilot's manual input signals which signals can then be applied as desired to various of the controlled surfaces;

FIGURES 4a and 4b and FIGURE 5 illustrate one arrangement of control surfaces; i.e. the controlled surfaces as they appear on the wings of a particular aircraft are shown in FIGURE 4 while the controlled surfaces as they appear on the tail surfaces of a particular aircraft are shown in FIGURE 5;

FIGURE 6 is a schematic illustration representing the redundant generation of power utilized to operate the redundant system of the present invention; and FIGURE 7 is a table setting out the various symbols utilized on the drawings and defining the same.

A redundant control system in accordance with the present invention and one which is particularly adapted for utilization with a plurality of controlled surfaces includes input signal generating means adapted to produce manually generated mechanical and automatically generated electrical input signals for positioning the controlled surfaces in a manner proportional to the input signals. A plurality of control channels is provided and each of these control channels includes a pair of signal summing means, each of which is connected to receive the input signals and is adapted to produce a separate output signal proportional to the received input signal. The control channels each further includes a positioning apparatus which is interconnected between each of the pair of signal summing means within the channel and one of the plurality of controlled surfaces in order to position this particular controlled surface in response to the application of the input signal. The system further includes means for detecting the response of the controlled surfaces to the output signals and for developing a monitor signal in response to such detection. In the event of discrepancy between preselected ones of the monitor signal means is provided for generating an error signal to disable that portion of the control system which has failed and thus caused the signal discrepancy.

Figure 1A:
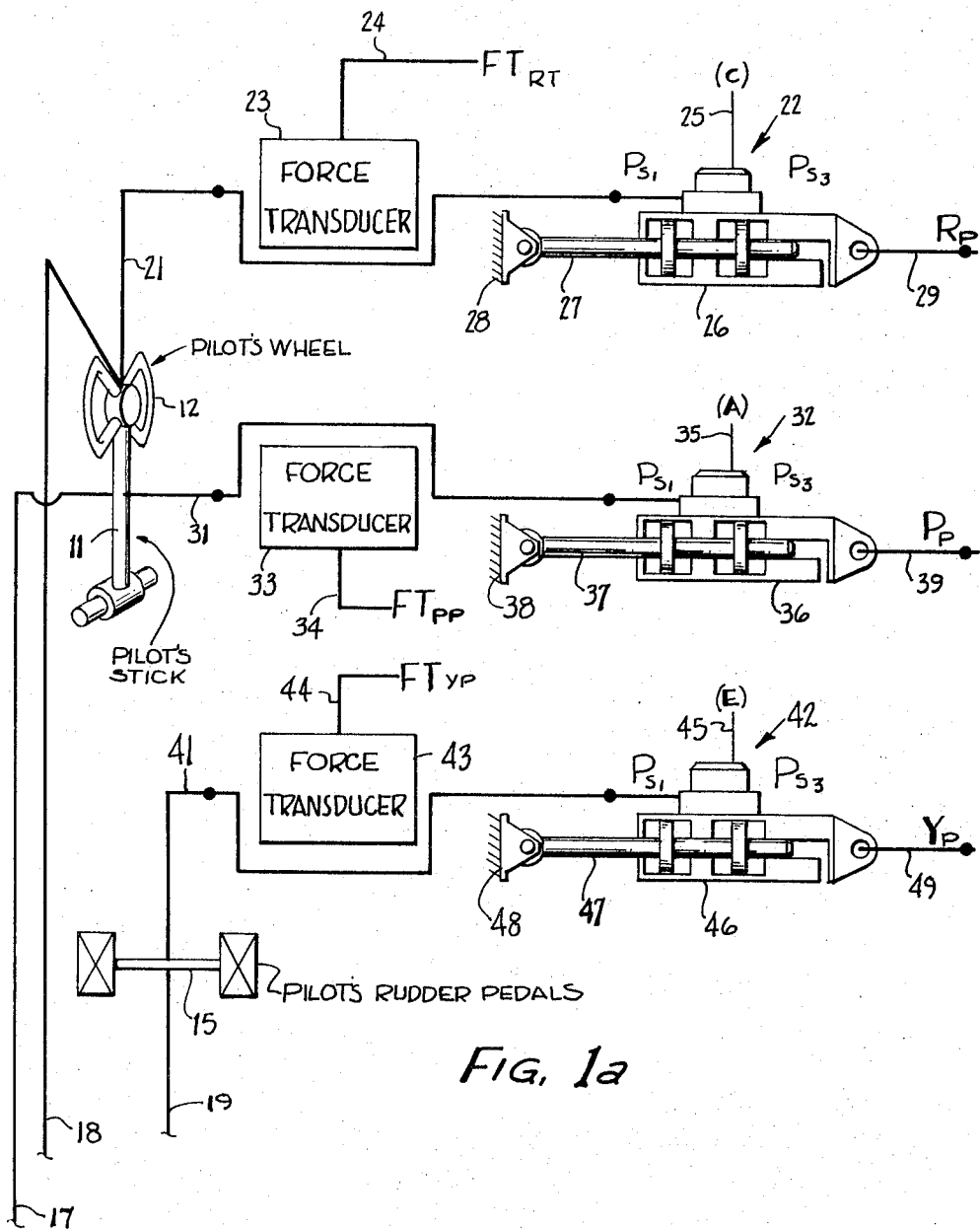
FIGURES 1a and 1b are schematic illustrations, representing the manual input signal generating apparatus, specifically in the present application the pilot's and co-pilot's manual control signal generating apparatus.
Figure 1B:
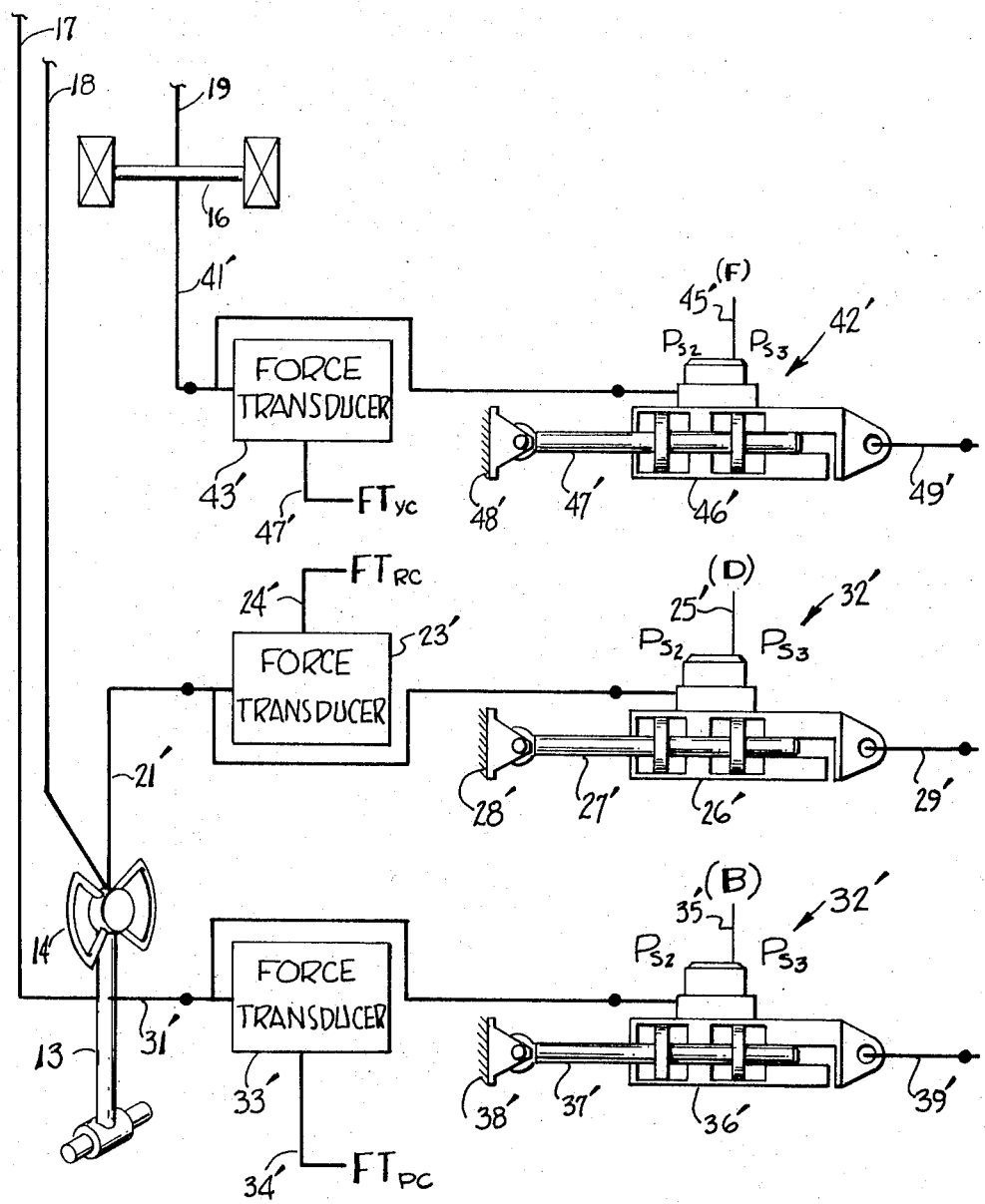

Referring now to the drawings and more particularly to FIGURE 1 thereof, there is therein illustrated schematically the manual means for developing an input signal for the redundant control system in accordance with the present invention. Among other things there is specifically illustrated schematically in FIGURE 1 the pilot's and co-pilot's apparatus traditionally found in typical aircraft. Such apparatus, for example, includes a pilot's stick 11 and a pilot's wheel 12. The co-pilot also has a control stick 13 and a wheel 14. Also included as a portion of the manual input control apparatus is the pilot's rudder pedals illustrated at 15 and the co-pilot's rudder pedals illustrated at 16. As is illustrated, the pilot's and co-pilot's sticks 11 and 13, respectively, are interconnected by means of a mechanical linkage 17 while the pilot's and co-pilot's wheels are interconnected by means of a mechanical linkage 18 and the pilot's and co-pilot's rudder pedals are interconnected by means of a mechanical linkage 19. As is well known in the art, the mechanical linkages 17, 18 and 19 cause the pilot's and co-pilot's apparatus to track each other and permit a control transfer without a "bump."

As is well known, the pilot's or co-pilot's wheels 12 and 14 control the roll attitude of the aircraft. The mechanical output from the pilot's wheel 12 is coupled by way of mechanical linkage 21 to a servo valve illustrated at 22 and to a force transducer shown in block form at 23.

It may be well at this point to briefly refer to FIGURE 7 of the drawings which sets forth a legend defining the various symbols utilized in these drawings. As is illustrated at FIGURE 7, a servo valve such as that shown at 22 and above referred to is of the type well known to the art and for example as illustrated in U.S. Patent 2,947,285. Such a servo valve is capable of receiving mechanical and electrical input signals and includes two spool valves movable therein, each of which controls hydraeric fluid flow therethrough from a source thereof for application to an actuator to cause movement thereof.

The second symbol on the legend illustrates a dual servo valve which includes in addition to the apparatus as above described, the ability to receive two sets of electrical and mechanical signals, which may each be from the same source, and in addition thereto also contains means for monitoring the position of the spool valves in each of the servo valves. A switching valve is shown at the bottom of each of the dual servo valve halves and is utilized to control the flow of hydaeric fluid from the servo valve to the actuator. The switching valve may be moved to cut off or control the hydaeric fluid flow in response to an error of switching signal developed by a comparator as will be more fully explained hereinbelow.

The next symbol illustrates a dual tandem actuator of a type well known in the art and which needs no additional description of explanation at this point.

The fourth symbol in the legend illustrates a mechanical piston lock which for example may be used with the dual tandem actuator to preclude relative movement between the body and the piston should such be desired.

The next two symbols illustrate comparators which receive input signals, compare the same internally, and develop an output signal in response to a predetermined relationship, such as a discrepancy, in the input signals applied thereto. The output signal of the comparator may then be applied, for example, to the switching valves in the dual servo valve to transfer flow from one servo valve to another for control of an actuator or alternatively may be applied to shut off a pressure to a servo valve, depending upon the particular manner in which a system is mechanized. As is also illustrated in the two comparator symbols, the comparator generates one or more output error signals in response to input signal discrepancies depending upon whether the same is adapted to be used with a system or a part thereof capable of functioning after one failure in the system. The remaining three symbols are self-explanatory and need no further description herein.

For a detailed description of a means for monitoring spool valve position, a switching valve and a comparator of a type capable of utilization herein reference is hereby made to U.S. patent application Ser. No. 481,981 filed Aug. 23, 1965 which is assigned to the same assignee as the present application.

As is described in said application a monitoring means may include a flapper having one end rigidly affixed to the housing of the servo valve and its opposite end attached to the spool valve and movable thereby as the spool valve moves. Positioned adjacent the flapper is nozzle means connected to a source of hydraeric pressure through a restriction orifice thereby to produce hydraeric pressure signal proportional to spool valve position. The monitor signals may be applied to a comparator which includes an appropriate number of spring balance spool valves having the monitor signals applied to opposite ends thereof in a predetermined logic pattern to ascertain not only discrepancies but also wherein the discrepancy lies. Upon a discrepancy, for example a difference in phase or amplitude between two monitor signals applied to a given spool valve, the spool valve translates and thereby connects system return or pressure to the switching valve. The switching valve may include one or more spool valves restrained in a cylinder by pressure or springs and movable when the signal from the comparator is applied to thereby switch hydraeric pressure from one servo valve to another for continued operation irrespective of a failure.

Referring again to FIGURE 1, it should be recognized that the force transducer 23 may be any transducer of the types known in the prior art capable of generating an electrical output signal in response to actuation of the pilot's and/or co-pilot's controls. The output signal from the force transducer is shown on lead 24 and is labeled $FT_{rp}$ which is a designation for force transducer roll-pilot's generated signal.

As indicated the servo valve 22 receives the mechanical signal by way of the linkage 21 being coupled preferably to the dual spool valves contained therein. The spool valves in this particular instance control the flow of fluid from a source of pressure PS1 and an alternate source of pressure PS3 as is indicated. In addition to receiving the mechanical signal from the pilot's wheel by way of linkage 21, the servo valve 22 is adapted also to receive an electrical signal on lead 25 and is designated (C) which is a signal generated by the aircraft flight control system and/or autopilot as will be more fully described below. The flow of fluid controlled by the servo valve 22 is applied to an actuator 26 which has the actuator rod 27 grounded or rigidly affixed to the aircraft frame as indicated at 28. Movement of the actuator generates a mechanical output signal which is indicated by way of symbol $R_p$ (roll-pilot generated signal) which is present or mechanical linkage 29.

The pilot's stick, as is well known in the prior art, is utilized to control or affect the pitch attitude of the aircraft. Movement of the pilot's stick is applied by way of a mechanical linkage 31 to a servo valve 32 which again controls the flow of hydraeric fluid from sources PS1, PS3. The mechanical signal from the pilot's stick is also applied to a force transducer 33 which develops an output signal which is applied to lead 34 and is designated by $FT_{pp}$ meaning Force Transducer pitch-pilot's generated signal.

In addition to the mechanical input signal on linkage 31 the servo valve 32 is adapted to receive an electrical input signal applied to lead 35 and designated (A) which again is applied by way of the aircraft flight control system and/or autopilot as will be described more fully hereinbelow. Servo valve 32 controls the flow of fluid from the sources PS1–PS3 to actuator 36 which has the actuator rod 37 grounded or rigidly affixed to the aircraft frame as shown at 38. Movement of the actuator 36 generates a mechanical signal which is applied to linkage 39 and is designated $P_p$ meaning Pitch-Pilot's generated signal.

Again as is well known in the prior art, the movement of the pilot's rudder pedals generates a signal which controls or affects the yaw attitude of the aircraft. Movement of the pilot's rudder pedals 15 generates a mechanical signal which is applied by way of linkage 41 to a servo valve indicated generally at 42. The signal present on linkage 41 is also applied to a force transducer 43 which generates an electrical signal proportional to the mechanical signal applied thereto and which appears on lead 44 and is indicated by the symbol $FT_{yp}$ meaning Force Transducer yaw-pilot generated signal.

In addition to the mechanical signal applied by way of linkage 41, the servo valve 42 is adapted to receive an electrical signal applied by way of lead 45 and designated (E) which is a signal generated by the aircraft flight control system and/or autopilot as will be more fully described hereinbelow. Application of the electrical and mechanical signals to the servo valve 42 causes the same to control the flow of hydraeric fluid therethrough from sources PS1–PS3. As is indicated flow of such fluid controls the movement of actuator 46 which has an actuator rod 47 which is grounded or rigidly affixed to the aircraft frame as indicated at 48. An output signal is developed by movement of the actuator 46 and is applied to linkage 49 and is designated $Y_p$ meaning Yaw-pilot's generated signal.

The remaining half of the manual means for generating input signals is identical to and is a mirror image of that above described with respect to the pilot's wheel, stick, and rudder pedals and are the well-known co-pilot's counterpart thereof. Such is designated by use of the same reference numerals above used but primed. The signals generated as a result of movement of the co-pilot's stick, wheel and rudder pedals 13, 14 and 16 respectively are indicated by the subscript $c$ following the designation of the signal, such for example as the signal generated by the force transducer 23' being designated $FT_{rc}$ meaning Force Transducer roll-co-pilot's generated signal.

Figure 2:
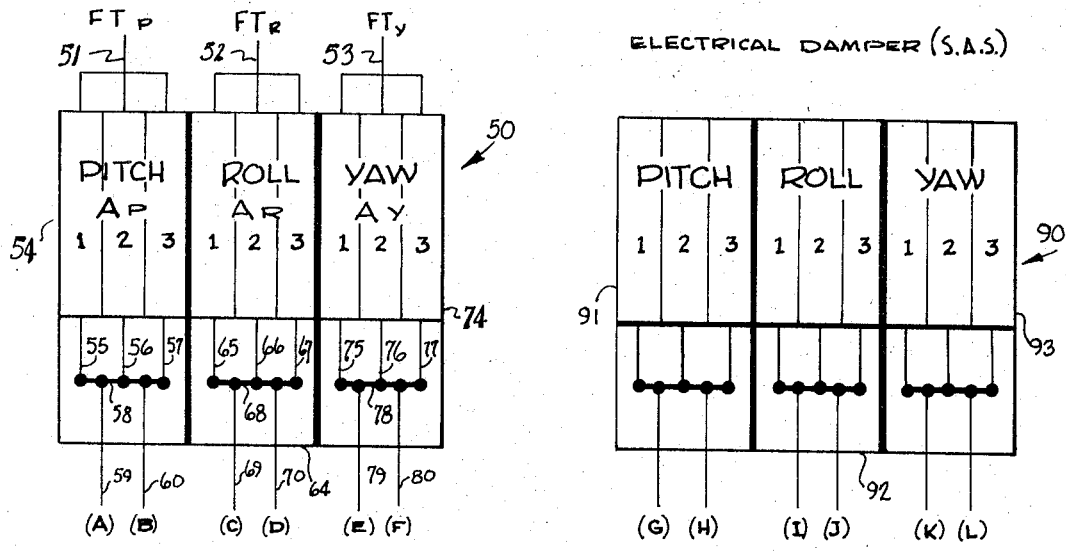
FIGURE 2 is a schematic illustration representing the automatic electrical signal generating apparatus, and in the present specifically illustrated aircraft control system represents the aircraft flight control system (A.F.C.S.) and/or autopilot as well as the damper or stability augmentation system (S.A.S.)

Referring now to FIGURE 2, there is illustrated in block form means well known to the prior art such as the aircraft flight control system and autopilot mechanism for automatically generating electrical signals. Movement of the pilot or co-pilot's stick, wheel or rudder pedals may be used to generate force transducer signals as above described. These signals may, with or without autopilot generated signals, affect the pitch, roll or yaw attitude of the aircraft and are applied to the automatic electrical signal generator 50 by means of leads 51, 52 and 53 which are connected to the pitch, roll, and yaw sections thereof respectively. It should be noted that each of the sections of the generator 50 are in turn divided into three separate channels.

As is well known in the prior art, the autopilot system of the aircraft may, in accordance with predetermined programming thereof, generate signals to control or affect the pitch, roll or yaw attitudes of the aircraft. These autopilot generated signals may also be coupled to or be generated within the electrical signal generator 50 as is indicated by the symbols $A_p$, $A_r$ and $A_y$ meaning respectively autopilot generated pitch, roll, and yaw signals. The pitch signal $FT_p$ from the force transducer 33 is applied as an input signal to each of the three channels in the pitch section 54 of the generator 50. As is illustrated in FIGURE 2, the output signals of the pitch section 54 appear at leads 55, 56, and 57 from channels 1, 2 and 3 respectively. These output signals are identical and are coupled together on a common bus 58. To this bus signals designated (A) and (B) appear on leads 59 and 60.

The roll section 64 of the electrical generator 50 has the roll signals generated by the force transducers $FT_r$ applied by way of the lead 52, and an autopilot signal $A_r$ is generated in each of the channels 1, 2 and 3 thereof. The output signals developed simultaneously by the channels 1, 2 and 3 are identical and are brought out of each of the three channels by way of leads 65, 66 and 67 respectively. These leads are coupled together on bus 68 to which in turn are coupled leads 69 and 70. These leads respectively have appearing thereon signals (C) and (D).

The yaw section 74 of the signal generator 50 also is divided into three separate channels, 1, 2, and 3. The yaw signals developed by the force transducer $FT_y$ are applied by way of lead 53 to and autopilot signal $A_y$ is generated in each of the channels 1, 2 and 3 respectively. The output signals from the channels 1, 2 and 3 appear on leads 75, 76 and 77 which are brought together on a common bus 78. Output leads 79 and 80 are coupled to the bus 78 and respectively contain output signals (E) and (F).

It should now be apparent that the signals appearing on leads 59 and 60 and designated (A) and (B) are identical to each other. It should also be apparent that the output signals from each of the channels 1, 2 and 3 in the pitch section 54 of the generator 50 are also identical. A similar situation occurs with respect to the signals generated in the roll section and the yaw sections in that the signals (C) and (D) are identical to each other, while the signals (E) and (F) are identical to each other. Thus it should become apparent that there is a redundancy in the pitch section, in the roll section and in the yaw sections 54, 64, and 74 respectively of the electrical signal generator 50. Under these circumstances, the aircraft redundant control system can withstand a failure in any one of the channels of the electrical signal generating sections without requiring a shutdown of the electrical signal generating section.

As is also illustrated in FIGURE 2, pitch, roll, and yaw signals are generated by the electrical damper or stability augmentation system 90 of the flight control system. The generation of the damper signals is well known to the art and will not be described in detail herein. It should however be noted that the pitch, roll, and yaw sections 91, 92 and 93 respectively of the electrical damper 90 have triple channels, the output signals of which are identical and are coupled together as was above described. Thus output signals (G) and (H) are identical to each other, (I) and (J) are identical to each other, and (K) and (L) are identical to each other.

In some systems the controlled surfaces are often required to operate in a push-pull fashion; i.e., if one of the controlled surfaces is to move in a given direction then other of the controlled surfaces must move in the opposite direction by an equal amount. Under these conditions, particularly wherein there is redundancy and it is necessary for the mechanical as well as electrical or hydraeric signals to be applied in such a manner as to effect control over the controlled surfaces, the signals must be inverted. Furthermore, in certain instances, the control signals must be combined in order to effect a given positioning of preselected ones of the controlled surfaces. Such mechanical inverters and mechanical mixers are well known in the prior art and it is therefore not deemed necessary to illustrate the same in great detail herein. However, it is considered of some pertinence to illustrate the application of particular mechanical signals to mechanical inverters and mixers in order to generate proper signal flow understanding of the system. Therefore reference is now made to FIGURE 3 which illustrates such mechanical inversion and mixing of signals in diagrammatic block form. As is illustrated in FIGURE 3, the co-pilot's roll and pitch signals $R_c$ and $P_c$ respectively are applied by way of mechanical linkages 101 and 102 to a mechanical mixer 103. The output of the mechanical mixer is in this particular instance the sum of the co-pilot's pitch and roll signals and appears on mechanical linkage 104 and is designated $E_{c1}$.

The pilot's roll and pitch signals $R_p$ and $P_p$ appear on mechanical linkages 105 and 106 and are applied to mechanical mixer 107. The output of the mechanical mixer 107 appears on linkage 108 and is the sum of the pilot's roll and pitch signals and is designated $E_{p1}$.

The co-pilot's roll signal appears on mechanical linkage 111 which is applied as an input signal to mechanical inverter 112. The output of mechanical inverter 112 appears on linkage 113 and is designated $-R_c$. The co-pilot's pitch signal appears on mechanical linkage 114. The co-pilot's minus roll signal and the pitch signal are applied as input signals to the mechanical mixer 115. The output of the mechanical mixer 115 appears on linkage 116 and is the co-pilot's pitch signal minus the co-pilot's roll signal and is designated $E_{c2}$.

The pilot's roll signal appears at mechanical linkage 121 and is applied as an input signal to the mechanical inverter 122. The output signal from the mechanical inverter 122 appears on linkage 123 and is designated $-R_p$. The pilot's pitch signal appears on linkage 124. The negative pilot's roll signal and the pilot's pitch signal are applied as inputs to the mechanical mixer 125, the output of which appears on linkage 126 and is the pilot's pitch signal minus the pilot's roll signal and is designated $E_{p2}$.

Referring now to FIGURE 4, there is therein schematically illustrated a plurality of controlled surfaces each of which is to be positioned proportional to the input signals which have been generated in the manner described above. In the specific example illustrated in FIGURE 4, the plurality of controlled surfaces are located on the wings of a typical supersonic aircraft and include the ailerons, elevators, and elevons of the wing. As is well known in the prior art, the ailerons of an aircraft control the roll attitude thereof. The ailerons as ilustrated in FIGURE 4 are shrown at 151 and 152 for the right and left portions of the wing respectively. On a supersonic type aircraft, the elevators may be also located on the wing and control the pitch attitude of the aircraft. The elevators as illustrated in FIGURE 4 are inboard of the ailerons and are illustrated at 153 and 154 for the right and left wings respectively.

As is also well known in the prior art insofar as aircraft of the present generation type are concerned, the roll and pitch attitudes of the aircraft are often further combined into a single control element referred to as an elevon. The elevon thus performs the dual function often performed by an aileron and an elevator, thus the contracted name. The elevons are as illustrated on the right wing at 155 and 156 and on the left wing at 157 and 158.

Referring first to the aileron and particularly the one on the right wing 151, it is seen that the position thereof is controlled in response to mechanical and electrical input signals; e.g. the mechanical roll signals generated by the pilot's wheel $R_p$ and the co-pilot's wheel $R_c$ are applied by way of linkages 161 and 162 to a combined linkage 163. Thus the pilot's and co-pilot's roll signals are applied in a redundant fashion to the linkage 163. The linkage 163 also is extended to apply the mechanical signal directly to the spools of the servo valve 160. As is also noted, the mechanical input signal $R_p$ or $R_c$ as the case may be, may be applied through a feed in spring element 164 and 165 to the armature of the torque motor. In addition thereto signals may be applied to the torque motor of the servo valve 160 by way of the leads 166 and 167; e.g. the electrical signal (I) and (J) developed by the electrical damper roll channel 92 are in the present specific embodiment applied to the servo valve 160. The two portions of the servo valve 160 control the flow of fluid from pressure source $P_{s1}$ and $P_{s3}$ therethrough to an actuator 168. It should be noted that the fluid flows through an engage or switching valve portion 169 of the servo valve 160. The actuator 168 includes a rod 171 which is anchored as shown at 172 to the airframe, for example, and the housing 173 of the actuator 168 is connected by way of a mechanical linkage 174 to aileron 151 to control its position in response to differential pressure across the pistons connected to the rod 171, as is well known in the prior art. As the positions of the spool valve in the servo valve 160 change, an output monitor signal is developed thereby and is applied by way of leads 175 and 176 to a comparator 177. The output signals thus developed are indicative of and proportional to a command signal to aileron 151 and may for example be a hydraeric signal if such is desired. The comparator 177 ascertains whether or not the two signals applied thereto are substantially the same within certain predetermined limits. In the event of a discrepancy between the two signals an output switching or error signal is developed by the comparator 177 and appears at lead 178. This signal may then be applied to the switching valve 169 to cause the same to shut down the servo valve 160 and preclude further operation thereof in response to the combination of the mechanical and electrical signals. If such is desired, a comparator having two failure modes could be utilized and the monitor signals developed by each of the ailerons at opposite ends of the wing could be applied thereto so as to cause a fail-operate mode to be utilizable for aileron position; i.e., upon a discrepancy signal occurring, the error signal would cause the respective switching valve to transfer control from one portion of the servo valve to another.

An operation similar to that above described is utilized in conjunction with the two elevators 153 and 154 to which reference is hereby made. As is therein seen, a servo valve 180 similar to the servo valve 160 above described is utilized the respect to elevator 153 while a similar servo valve 190 is used with respect to the elevator 154. The pitch signals $P_p$ and $P_c$ are applied from the pilot's and co-pilot's sticks respectively to the servo valve as mechanical input signals as is illustrated. Electrical input signals are applied from the pitch control section 91 of the damper 90 as shown at (G) and (H) to the servo valve. The servo valves 180 and 190 control the flow of fluid pressure from sources $P_{s1}$ and $P_{s2}$ to the actuators 181 and 191 respectively, the positioning of which in turn controls the positioning of the elevators 153 and 154. Monitor signals are developed by the servo valve 180 and are applied by way of leads 182 and 183 to the comparator 185. Monitor signals are developed by the servo valve 190 and are applied by way of leads 192 and 193 to the comparator 185. Error signals are generated internally in the comparator 185 in response to discrepancy between preselected ones of the monitor signals applied thereto and the error signals appear on output leads 186 and 196. The output lead 186 would be connected to the switching valve 189 of the servo valve 180 while the output error signal appearing at lead 196 would be connected to the switching valve 199 of the servo valve 190. Thus in the event of a discrepancy between the respective applied signals to the comparator, the error or switching signal causes transfer of control from one portion of the servo valve 180 to another with respect to elevator 153 or from one portion of the servo valve 190 to the other with respect to elevator 154 depending upon where the failed component resided. Under these conditions transfer from one failed portion of the system to an operable portion of the system is caused to occur extremely quickly and with no degradation in system operation.

In the event of a subsequent failure occurring within the elevator control channels an additional signal is developed by the comparator 185 and appears on leads 186 and 196 depending upon where the failed component resided. Under these conditions, i.e., a second failure occurring within the same control channel, the respective switching valve 189 or 199 would again be actuated and would switch out the electrical control signals from the servo valves 180 and 190. Under these operating conditions the control of the elevator surfaces 153 and 154 would then be under the manual operational control of the pilot and/or co-pilot. Thus the pilot's movement of the pilot's stick would apply a pitch control signal mechanically through the linkage $P_p$ to the servo valve 180 and 190 directly to the spool valve and to the armature of the torque motor thereof. The application of this mechanical signal directly would affect the flow of hydraulic or hydraeric fluid into the actuator 181 and 191 thus moving the surfaces 153 and 154 accordingly. As above referred to, the particular aircraft with which such a system as is involved in the present invention is utilized, a hydraulic assist or boost is necessary for the pilot to be able to move the control surfaces under the speeds and operating conditions encountered.

A similar control system is found with respect to each of the elevons found on each of the wings. The differences which should be noted for purposes of the present discussion are that the input electrical signals applied to the torque motors 201 and 202 utilized in conjunction with the elevons 155 and 156 respectively on the right wing are the pitch signal (G) and the roll signal (I) are applied to one electrical lead; i.e. to the lead of one of the torque motors of one of the dual servo valves 201 while signals (H) and (J) from the pitch and roll of the electrical damper respectively are applied to the other. Similar such signals are applied to the valve 202. The mechanical input signals applied to the torque motors 201 and 202 are $E_{c1}$ which are the output signals from the mechanical mixer 103 as above described. With respect to the torque motors 203 and 204 utilized to control the position of the elevons 157 and 158 it should be noted that the electrical signals applied thereto are (G) (—I) to one side thereof and (H) and (—J) to the other side thereof emanating from the pitch section 91 of the electrical damper 90 and the roll section 92 thereof. The mechanical signals applied to the elevons 157 and 158 are $E_{c2}$ and $E_{p2}$ which are the outputs of the mechanical mixers 115 and 125 respectively as above described.

The remaining details of the various servo valves utilized with respect to each of the controlled surfaces on the wings is similar to that described above with respect to the aileron and the elevators and therefore it is thought that no additional detailed description thereof is necessitated at the present moment.

Referring now to FIGURE 5, it will be seen that the yaw of the aircraft is controlled as is well known by the rudders which are divided into a multi-surface control, namely, 1, 2 and 3 all located on the vertical tail surface of the aircraft. As was the case with the aileron, rudder 3 is controlled by a servo valve 221 while rudders 2 and 1 are controlled by servo valves 222 and 223 respectively. The servo valve 221 operates very much in the fashion as did the ailerons above referred to in that the comparator 224 functions to provide an error signal in the event of discrepancy between the signals applied thereto to cause the servo valve 221 to have the electrical signals removed therefrom and thus to operate only in conjunction with the mechanical input. Rudders 1 and 2 on the other hand operate in the manner similar to that described with respect to the elevons above described; i.e. in the event of a discrepancy between the monitor signals applied to the comparator from the servo valve 222 and 223, an error or switching signal is developed by the comparator to be applied back to the switching valve associated with the servo valves 222 and 223 respectively to transfer control from one portion of the valve which has failed to a non-failed and operating portion thereof. Thus it is seen that there is a redundant control for rudders 1 and 2 so that the system may switch to a fail-operate mode of operation should such be desired. The input signals to the respective servo valves 221, 222 and 223 are as indicated by the symbols associated therewith and the sources of hydraeric fluid connected to the servo valves are as indicated in each case. It is therefore not deemed necessary to describe the operation of the servo valves actuators and control surfaces in response to signals applied to the servo valves in any further detail.

Referring now to FIGURE 6, the manner in which the hydraeric fluid sources are generated to provide a redundant system is illustrated. As is shown, engines 1 through 4 are the aircraft engines normally utilized to fly the aircraft. Connected to engine No. 1 is a hydraeric pump 301 while connected to engine 4 is a second hydraeric pump 302. Hydraeric pumps 301 and 302 are utilized to supply source of hydraeric fluid designated $P_{s1}$ which is supplied through conduits 303 to various portions of the system as desired and indicated by the designation $P_{s1}$.

Connected to engine No. 2 is a hydraeric pump 304 while connected to engine No. 3 is a second hydraeric pump 305. The hydraeric pumps 304 and 305 operate to provide source of hydraeric pressure designated $P_{s2}$ which is supplied by way of conduit 306 to the various portions of the system requiring the same. In addition to the system's sources of pressures $P_{s1}$ and $P_{s2}$, there is a third source $P_{s3}$. Source of pressure $P_{s3}$ is generated by two hydraeric pumps 307 and 308 which supply the source $P_{s3}$ in parallel as have the parallel connected pumps above previously described. However, hydraeric pump 307 is powered by an electric motor 309 while hydraeric pump 308 is powered by a separate electric motor 310. The electric motors 309 and 310 in turn have power supplied to them in a redundant fashion by alternators 312 through 315. It should be noted that the alternators 312 through 315 are connected respectively to engines 1 through 4 thus providing a source of electrical power to the electric motors to thus supply the hydraeric pumps connected thereto. It can therefore be seen that to lose the source of pressure $P_{s1}$ engines 1 and 4 would have to fail, while to lose the source of pressure $P_{s2}$ engines 2 and 3 would have to fail. And to lose source of pressure $P_{s3}$ engines 1 through 4 would have to fail. It can therefore be seen that the source of hydraeric power supplied to the various portions of the system is supplied in a redundant fashion therefore enabling the control system to operate quite efficiently and particularly in the event of a second failure in any section thereof to supply hydraeric fluid for the purposes of aiding the pilot by hydraeric boost or assist to move the various control surfaces of the aircraft.

There has thus been disclosed in some detail in schematic form a control system which operates in redundant fashion for controlling supersonic or large type aircraft having multiplicity of control surfaces. Although this detail is applied and described and illustrated with respect to aircraft, it is to be expressly understood that the same is available for utilization and adaptable to systems having multiplicity of surfaces or members to be positioned in accordance with input control signals and therefore should not be limited to aircraft.

What is claimed is:

1. A redundant control system for use in positioning a multiplicity of controlled surfaces in response to input signals applied to said system and adapted to detect and disable malfunctioning portions of said system comprising:
  (a) input signal generating means for producing mechanical and electrical input signals for positioning said controlled surfaces proportional thereto:
  (b) a plurality of control channels each including:
    (1) first and second signal summing means each connected to receive mechanical and electrical input signals and to produce a separate output signal proportional to said received signals,
    (2) positioning means connected between each of said first and second signal summing means and one of said multiplicity of controlled surfaces to position said one of said controlled surfaces in response to said input signals;
  (c) means connecting said input signal generating means to said first and second signal summing means in each of said channels;
  (d) comparator means;
  (e) sensing means for detecting said separate output signals and producing a monitor signal in response thereto;
  (f) means connecting said monitor signals to said comparator means, said comparator means being adapted to produce an error indicating signal in response to discrepancy between preselected ones of said monitor signals; and
  (g) means connecting said error indicating signals to said system to disable failed portions of said control channels responsible for said discrepancy.

2. A control system as defined in claim 1 wherein said input signal generating means includes a manually controllable input signal generating device, an automatic electrical signal generating device, and means connecting signals generated by each of said devices to said signal summing means.

3. A control system as defined in claim 1 which is hydraerically powered and which includes a plurality of sources of hydraeric fluid under pressure, a plurality of hydraeric pump means for generating each pressure source, a plurality of energy sources, each connected to one of said pumps, thereby to provide hydraeric fluid under pressure in the event of failure of one or more pressure sources.

4. A control system as defined in claim 3 in which one of said energy sources is an electrical motor and another of said sources is a jet engine.

5. A control system as defined in claim 2 in which said automatic electrical signal generating device includes a plurality of electrical channels, each of said channels being duplicated, a transducer means connected to said manually controllable device and the output signal from said transducer means being connected to said electrical channels.

6. A control system as defined in claim 5 in which said electrical signal generating device includes an aircraft autopilot and electrical dampers.

7. A control system as defined in claim 5 which further includes a hydraerically powered actuator controlled by a servo valve adapted to receive manual input signals from said manually controllable device and electrical signals from said electrical channels to produce an output signal proportional to the sum of said mechanical and electrical signals, and means connecting said actuator to said first and second summing means.

8. A control system as defined in claim 6 which includes a plurality of said actuators each connected to preselected ones of said first and second signal summing means and which further includes mechanical signal mixer means for predetermined ones of said signal summing means.

9. A control system as defined in claim 8 in which said first and second summing means in each of said channels is a hydraeric dual servo valve adapted to receive electrical and mechanical input signals and produce an output hydraeric signal proportional thereto.

10. A control system as defined in claim 9 in which each of said servo valve is adapted to produce a monitor signal proportional to said output hydraeric signal, and a separate comparator means is associated with preselected ones of said controlled surfaces, said preselected surfaces being adapted to perform the same function.

References Cited
UNITED STATES PATENTS

| | | | |
|---|---|---|---|
| 3,124,041 | 3/1964 | McMurtry et al. | 91—363 |
| 3,190,185 | 6/1965 | Rasmussen | 91—363 |
| 3,295,420 | 1/1967 | Gleason | 91—413 |

MARTIN P. SCHWADRON, *Primary Examiner.*

PAUL E. MASLOUSKY, *Examiner.*